United States Patent
Kawai (10) Patent No.: US 6,188,733 B1
(45) Date of Patent: Feb. 13, 2001

(54) CENTER FREQUENCY ERROR DETECTING CIRCUIT FOR FSK SIGNAL RECEIVER

(75) Inventor: Kazuo Kawai, Tokyo (JP)

(73) Assignee: General Research of Electronics, Inc. (JP)

( * ) Notice: Under 35 U.S.C. 154(b), the term of this patent shall be extended for 0 days.

(21) Appl. No.: 09/008,114

(22) Filed: Jan. 16, 1998

(51) Int. Cl.[7] ............................... H03D 3/00; H03B 1/16
(52) U.S. Cl. ....................... 375/334; 455/337; 329/300
(58) Field of Search ................................ 375/334, 326, 375/344, 335, 327, 328, 324, 372; 455/337, 316, 313, 314, 182.2, 192.2, 264, 255; 435/209; 329/315, 300, 306, 302

(56) References Cited

U.S. PATENT DOCUMENTS

| | | | |
|---|---|---|---|
| 4,827,488 | * 5/1989 | Shibano | 375/328 |
| 5,414,736 | * 5/1995 | Hasegawa et al. | 375/334 |
| 5,717,721 | * 2/1998 | Kawai | 375/326 |
| 6,038,268 | * 3/2000 | Kawai | 375/334 |

\* cited by examiner

*Primary Examiner*—Chi H. Pham
*Assistant Examiner*—Khai Tran
(74) *Attorney, Agent, or Firm*—Trexler, Bushnell, Giangiorgi, Blackstone & Marr, Ltd.

(57) ABSTRACT

In the system according to the prior invention, in order to shape the demodulated base-band signal of an FSK signal from a frequency discriminator 1 into a rectangular waveform, a waveform shaping circuit which may comprise a comparator 2 is typically provided. Any error is detected by finding a difference between the input and output signal of this comparator after the amplitudes thereof were made equal and smoothing its result. The reason why with this system the above-mentioned disadvantage occurs is that in the case of a bit synchronization signal, for example, at the point of time when its center level becomes equal to the shaping circuit output level a zero output is provided by the operation of the subtraction. In this invention, a correcting signal deriving circuit 6 is provided which generates such waveform portions of the base-band signal waveform that they protrude from the shaping circuit output waveform or a waveform corresponding to such protruding portions, said protruding waveform portions or corresponding waveform being superimposed on the output of an addition/subtraction circuit 11 to avoid the occurrence of the disabled point of error detection.

7 Claims, 6 Drawing Sheets

Prior Art

(c)

Prior Art

CENTER FREQUENCY ERROR DETECTING CIRCUIT FOR FSK SIGNAL RECEIVER

FIELD OF THE INVENTION

This invention relates to a circuit constructing technique for constructing circuit means which detects any center frequency error in a demodulated base-band signal, in a packet FSK (Frequency Shift Keying) signal receiver which can be used in an AFC (Automatic Frequency Control) circuit for correcting a center frequency error of an IF (Inter Frequency) signal, a demodulated signal correcting circuit for correcting a bias distortion of a demodulated base-band signal with the base-band portion in itself, or the like.

BACKGROUND OF THE INVENTION

An FSK signal is a signal for carrying digital information in the form of its frequency modulation ("0" and "1" components of the information are transmitted at frequency $f_0$ and $f_1$, respectively), and therefore if there is an error in the center frequency of the IF signal, a bias distortion is caused to be produced in the demodulated base-band signal. Accordingly, to avoid this, it is needed to carry out some correction by detecting an error of the center level of this base-band signal, that is a DC offset component and then either correcting a frequency error itself using AFC so that the DC offset component is eliminated from the base-band signal or correcting this DC offset using the base-band signal itself so that the DC offset component is eliminated therefrom. Moreover, in any case, they must have such a characteristic that they are not affected by the contents of transmission code. This means that, in case of the AFC, they must respond not to the frequencies of $f_0$ and $f_1$ of the signal under transmission, but to the center frequency thereof. If not so, when for example "1" of information is iteratively transmitted for a long time, the AFC is caused to be drawn to $f_1$, so that a plenty of code errors are produced.

In order to cope with this, various AFC systems have been thought which are not sensitive to the contents of the code. In one of these systems, positive and negative peak values of a demodulated base-band signal are detected and held, and then the mean value of these held positive and negative peak values is sought, on the basis of which a center level error, that is a DC offset component is detected. The second system uses a bit synchronization signal in the demodulated base-band signal (comprising alternative repetition of "0" and "1" of information) positioned at the header portion of a packet, which bit synchronization signal has been transmitted usually in the form of a sine wave in the base band for the purpose of narrow frequency-band transmission. In this second system, any center level error is estimated on the basis of the oscillatory rule of this sine wave. The third system detects any DC offset component by comparing the demodulated base-band signal with a rectangular signal into which this demodulated base-band signal was shaped, after the demodulated base-band signal and shaped rectangular signal have been made equal in amplitude. However, in these system, it has been found that following problems arise. In the first system, since it needs to keep both the peak values held, held voltages would possibly start to be discharged in case where "0" or "1" is transmitted successively for a long time. Also, in the second system, since it is needed to hold the estimated center level error until the related packet will be completed, there would arise a problem relating to discharging of the held level as in the case of the first system, in case where a long packet is utilized. The third system which was proposed by the same inventor as in this application and published in the Gazette of Japanese Pre-publication No. 235954/1995 entitled "Demodulation Correcting Circuit for FSK Signal Receiver", which is incorporated herein by reference, can avoid the problem of discharging in the above-mentioned first and second systems, but has been recently found that it has a following disadvantage.

Figure 1:
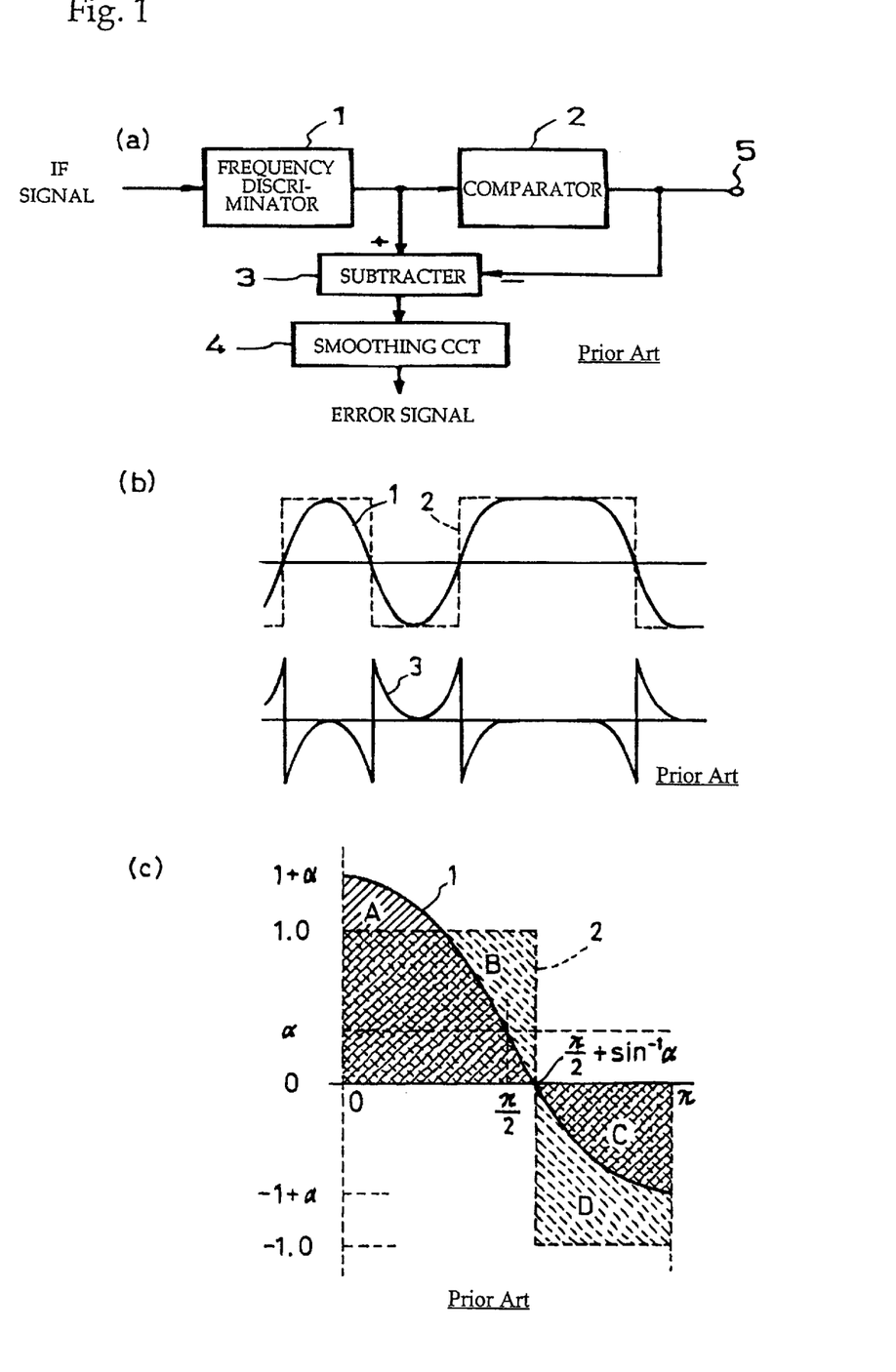

FIG. 1 shows the principle on the basis of which any center error is detected in the system according to the Japanese Pre-publication No. 235954/1995. It should be appreciated that this view is modified somewhat with respect to the original view in order to make the explanation thereof more understandable. FIG. 1(a) illustrates a circuit construction of the detecting part and FIG. 1(b) output waveforms from various elements in the detecting part in FIG. 1(a). In FIG. 1(a), a frequency discriminator 1 receives at its input an input FSK signal from an IF (Intermediate Frequency) stage in an FSK signal receiver. The IF signal received by the frequency discriminator 1 is frequency detected thereby and output therefrom as a base-band signal. The demodulated base-band signal is applied both to a comparator 2 and a subtracter 3. The comparator 2 has a comparison reference voltage of 0 volt and is set to make the amplitude of the input base-band signal and the amplitude of its output signal equal. FIG. 1(b) shows the demodulated base-band signal waveform (1) which is input to the comparator 2 and the comparator output signal waveform (2), in case where the center error is zero. The subtracter 3 which receives the base-band signal waveform (1) and the comparator output signal waveform (2) at its positive and negative input, respectively, carries out the operation of subtraction, that is {the waveform (1) the waveform (2)}. In FIG. 1(b), a waveform (3) identifies the output of the subtracter 3 in case where there is no center error. This signal is smoothed by a smoothing circuit 4 to provide a center error detected output signal. Accordingly, it can be understood from FIG. 1(a) and (b) that in this system there is no influence of the contents of the transmission code thereon.

If a DC offset occurs due to a frequency error, the waveform (1) will shift in FIG. 1(b) upward or downward depending upon the amount of such DC offset; accordingly, zero-cross points are changed. FIG. 1(c) shows as an enlarged view a half-period portion of the sine wave which can be obtained at that time. Assuming that the amplitude of the waveforms (1) and (2) is 1, and the amount of offset is α, the angle of phase at the zero-cross point can be expressed in the following equation:

$$\frac{\pi}{2} + \sin^{-1}\alpha$$

Also, in FIG. 1(c) areas A, B, C and D are defined by respective portions shown by continuous or dotted oblique lines, and are expressed as follows:

$$\text{area } A = \alpha\left(\frac{\pi}{2} + \sin^{-1}\alpha\right) + \cos(\sin^{-1}\alpha) \quad (1)$$

$$\text{area } B = \alpha\left(\frac{\pi}{2} - \sin^{-1}\alpha\right) + \cos(\sin^{-1}\alpha) \quad (2)$$

$$\text{area } C = \frac{\pi}{2} + \sin^{-1}\alpha \quad (3)$$

$$\text{area } D = \frac{\pi}{2} - \sin^{-1}\alpha \quad (4)$$

To carry out the subtraction by means of the subtracting circuit 3 and the smooth by means of the smoothing circuit 4 corresponds to the operation for finding {(area A–area B)–(area C–area D)}. This result becomes an error signal and from the above equations (1) to (4) the value S thereof is as follows:

$$S = \alpha\pi - 2\sin^{-1}\alpha \text{ (in the case of } \alpha = 0 \sim 1) \quad (5)$$

These equations can be utilized only when $\alpha$ is within the range of 0~1. If $\alpha$ is more than 1, S is given as follows:

$$S = \alpha - 1 \text{ (in the case of } \alpha > 1) \quad (6)$$

Figure 2:
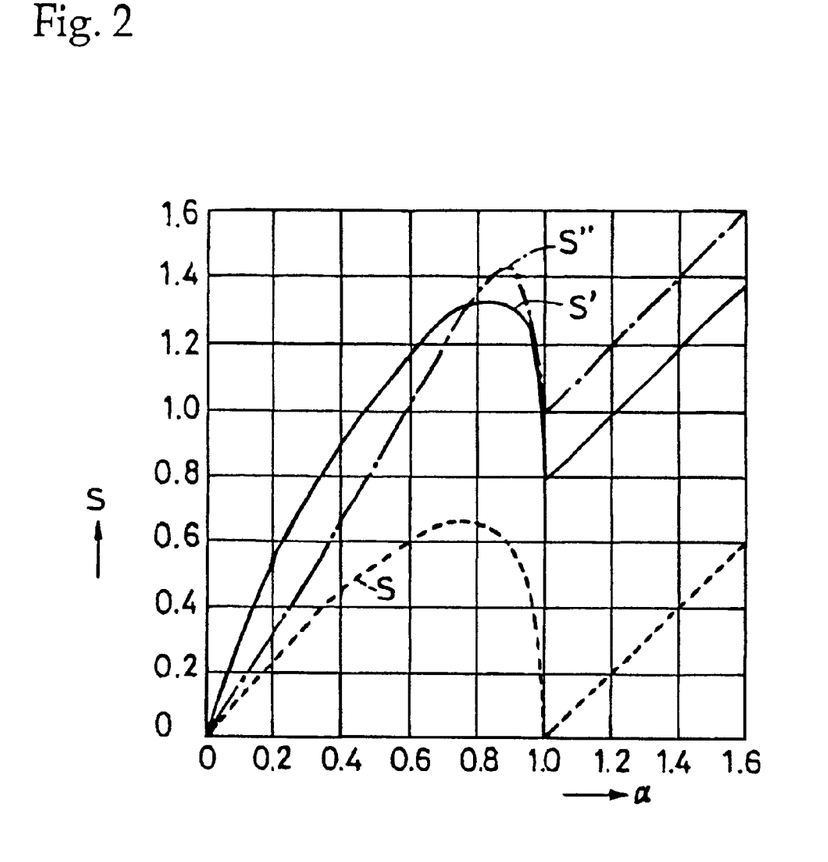
FIG. 2 shows error detection characteristics according to the circuit of FIG. 1(*a*) as well as circuits of this invention.

In case where S is negative, S is equivalent to {(area C–area D)–(area A–area B)}, and therefore, the signs of the equations (5) and (6) are simply reversed and for positive and negative values of $\alpha$, the relationship of S becomes odd-symmetry. A curve S indicated by dotted line in FIG. 2 identifies calculated values of S for values of $\alpha > 0$. Since output S at the point of $\alpha = 1$ becomes zero, this point reveals the fact that control is disabled, which results in the above-mentioned disadvantage of this third system. Therefore, it is needed to provide a control system which can avoid the occurrence of this zero point.

SUMMARY OF THE INVENTION

As mentioned above, although the system according to Japanese Patent Pre-publication No. 235954/1995 has its advantages that any center level error can be detected by a simple circuit construction without having any influence of transmission code contents, there occurs the disabled point of control whereat the frequency error is equal to the shift frequency of an FSK signal. Accordingly, a main object of this invention is to provide a circuit construction which is capable of detecting an error over all range by removing such disabled point of detection, while the advantages of the above-mentioned Japanese Patent Pre-publication No. 235954/1995 that it does not receive any influence of code contents can be retained.

Figure 3:
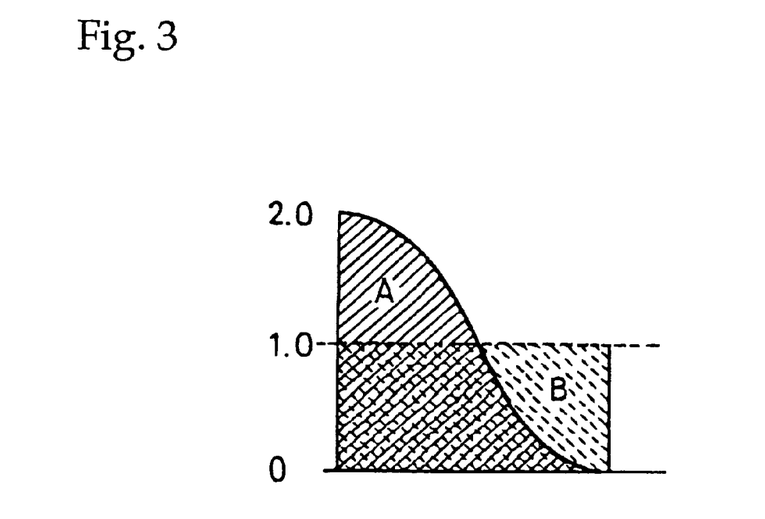
FIG. 3 shows a waveform which is utilized to explain the disadvantage of the circuit of FIG. 1(*a*)

In the system disclosed in the Japanese Patent Pre-publication No. 235954/1995, the point that the detection of an error is disabled is when an error frequency becomes equal to a shift frequency, that is as shown in FIG. 3 area A becomes just equal to area B. In this invention, in order to avoid this situation, a correction signal is applied depending upon the amount of an error by using some means. Several embodiments of this invention can realize this.

This invention provides a center frequency detecting circuit for an FSK signal receiver for detecting a DC center level of a base-band signal wherein a base-band signal obtained through demodulation of a received FSK signal is applied to an addition input of an addition/subtraction circuit as well as to a waveform shaping circuit for shaping it into a rectangular wave which constituting a demodulated output signal, said demodulated output signal being input to a subtraction input of said addition/subtraction circuit after it was made equal to said base-band signal in amplitude, and said addition/subtraction circuit providing an output which is adapted to be smoothed to obtain a detected error, said center frequency detecting circuit comprising: circuit means for correcting the above error detecting operation, said circuit means generating such waveform portions of the base-band signal waveform that they protrude from the subtraction input signal waveform to said addition/subtraction circuit, or a waveform formed by shaping said protruding waveform portions, said generated waveform portions or shaped waveform being applied to an additional input of said addition/subtraction circuit.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1(*a*) is a block diagram of the prior invention shown in Japanese Patent Pre-pubication No. 235954/1995, and FIGS. 1(*b*) and (*c*) are views illustrating waveforms which are used to explain the operation thereof;

FIG. 5(*a*) is a block diagram of a circuit according to a first embodiment of this invention, and FIGS. 5(*b*) and (*c*) are views illustrating waveforms which are used to explain the operation thereof, FIG. 6(*a*) is a block diagram of a circuit according to a second embodiment of this invention, and FIGS. 6(*b*), (*c*) and (*d*) are views illustrating waveforms which are used to explain the operation thereof; and FIG. 7(*a*) is a block diagram of a circuit according to a third embodiment of this invention, FIG. 7(*b*) shows a detailed circuit of a portion thereof and FIG. 7(*c*) is a view. illustrating a waveform which is used to explain the operation of the circuit of FIG. 7(*a*).

DESCRIPTION OF THE PREFERRED EMBODIMENTS

Figure 4:
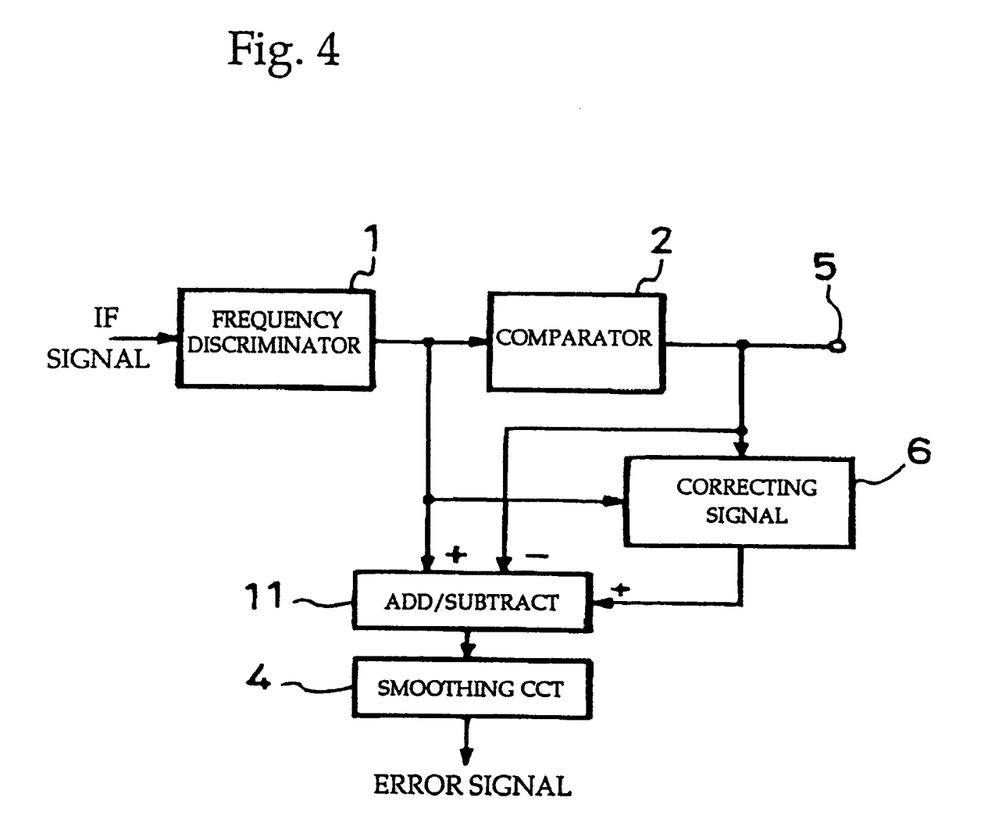
FIG. 4 is a block diagram showing the principle of this invention.

Referring now to FIG. 4, there is shown a block diagram illustrating the principle of the invention for removing the disabled point of error detection in the system disclosed in the Japanese Patent Pre-publication No. 235954/1995. A frequency discriminator 1 receiving an input FSK signal, a comparator 2 connected to a signal output terminal 5 and a smoothing circuit 4 providing an error signal are used in the same manner as in FIG. 1(*a*). However, a correcting signal deriving circuit 6 and an addition/subtraction circuit 11 are replaced in place of the subtracter 3 in FIG. 1(*a*). The correcting signal deriving circuit 6 receives outputs from the frequency discriminator 1 and comparator 2. The addition/subtraction circuit 11 receives at its positive input the output of the frequency discriminator 1 and at its negative input the output of the comparator 2, in the same manner as the subtracter 3 in FIG. 1(*a*). Further, the addition/subtraction circuit has its additional positive input for receiving the output of the correcting signal deriving circuit 6. The addition/subtraction circuit 11 has an output coupled to the input of the smoothing circuit 4.

Figure 5:
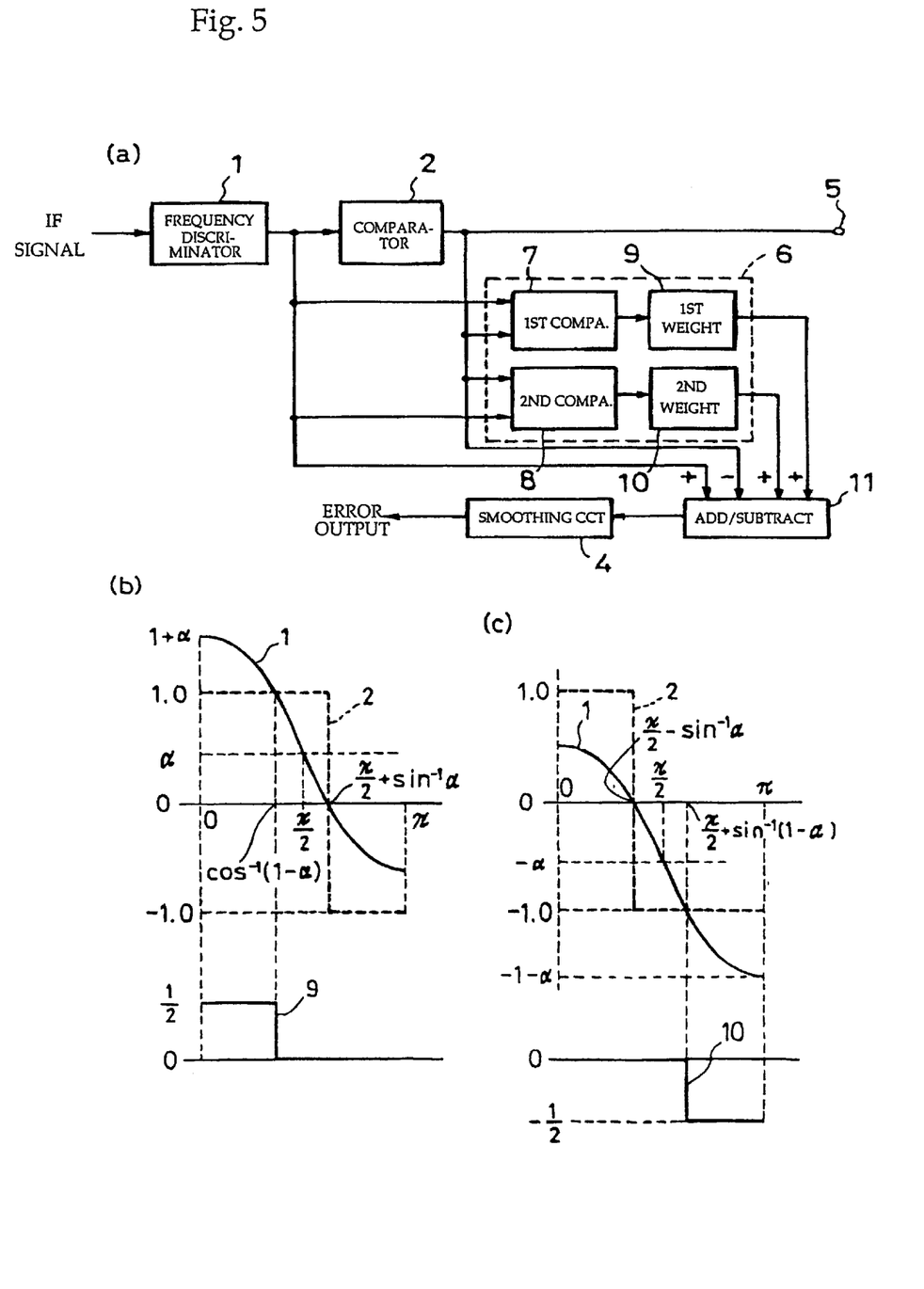

FIG. 5(*a*) shows a circuit according to one embodiment of this invention which materializes the principle of this invention as shown in FIG. 4 for adding a derived correcting signal to the addition/subtraction circuit 11 to remove the disabled point of error detection at the time of $\alpha = 1$. The circuit shown in FIG. 5(*a*) includes a frequency discriminator 1, a comparator 2 and a smoothing circuit 4, each of which operates in the same way as the corresponding one in FIG. 1(*a*). A correcting signal deriving circuit 6 enclosed by the dotted line frame and an addition/subtraction circuit 11 correspond to the corresponding circuits 6 and 11 in FIG. 4, respectively. The correcting signal deriving circuit 6 comprises first and second comparators 7 and 8, and first and second weight circuits 9 and 10. The first comparator 7 receives the output of the frequency discriminator 1 and the output of the comparator 2 and as shown in FIG. 5(*b*) it provides a positive pulse output only when the output (1) of the discriminator 1 became positive voltage with respect to the output (2) of the comparator 2. The second comparator 8 also receives the output of the frequency discriminator 1 and the output of the comparator 2 and operates in a reverse manner to provide, as shown in FIG. 5(*c*), a negative pulse output only when the output (1) of the discriminator 1 became negative voltage with respect to the output (2) of the comparator 2. The outputs of the first and second comparators 7 and 8 are coupled to the addition/subtraction circuit 11 through the first and second weight circuits 9 and 10, respectively. Therefore, even though the situation as shown in FIG. 3 at the time of $\alpha=1$ occur, a positive pulse is applied as the correcting signal from the comparator 7 to compensate for the zero point (note that in this case the pulse is not of a pulse form any longer, but the one of duty 100%, that is DC). The weights in the weight circuits 9 and 10 can be selected to various values. FIG. 5(*b*) shows a weight circuit output waveform (9) at the time when this weight was selected to ½ as an example. Assuming the smoothing circuit output for a in this case, that is the error output is expressed by S', it can be given as follows:

$$S'=\alpha\pi-2\sin^{-1}\alpha+K\cos^{-1}(1-\alpha) \quad (7)$$

In this equation, the third term identifies a correction factor, and K is a weight which can be set to an arbitrary value. Now, if with K=½, S' for $\alpha$ is found and plotted, then curve S' as shown by a solid line in FIG. 2 can be obtained. From this curve, it is clear that the correction has been carried out. In case where $\alpha$ is negative, a negative pulse (10) shown in FIG. 5(*c*) is added from the second weight circuit 10 to the addition/subtraction circuit 11 and a curve can be obtained which has an odd-symmetry with respect to the curve S' in FIG. 2.

Figure 6:
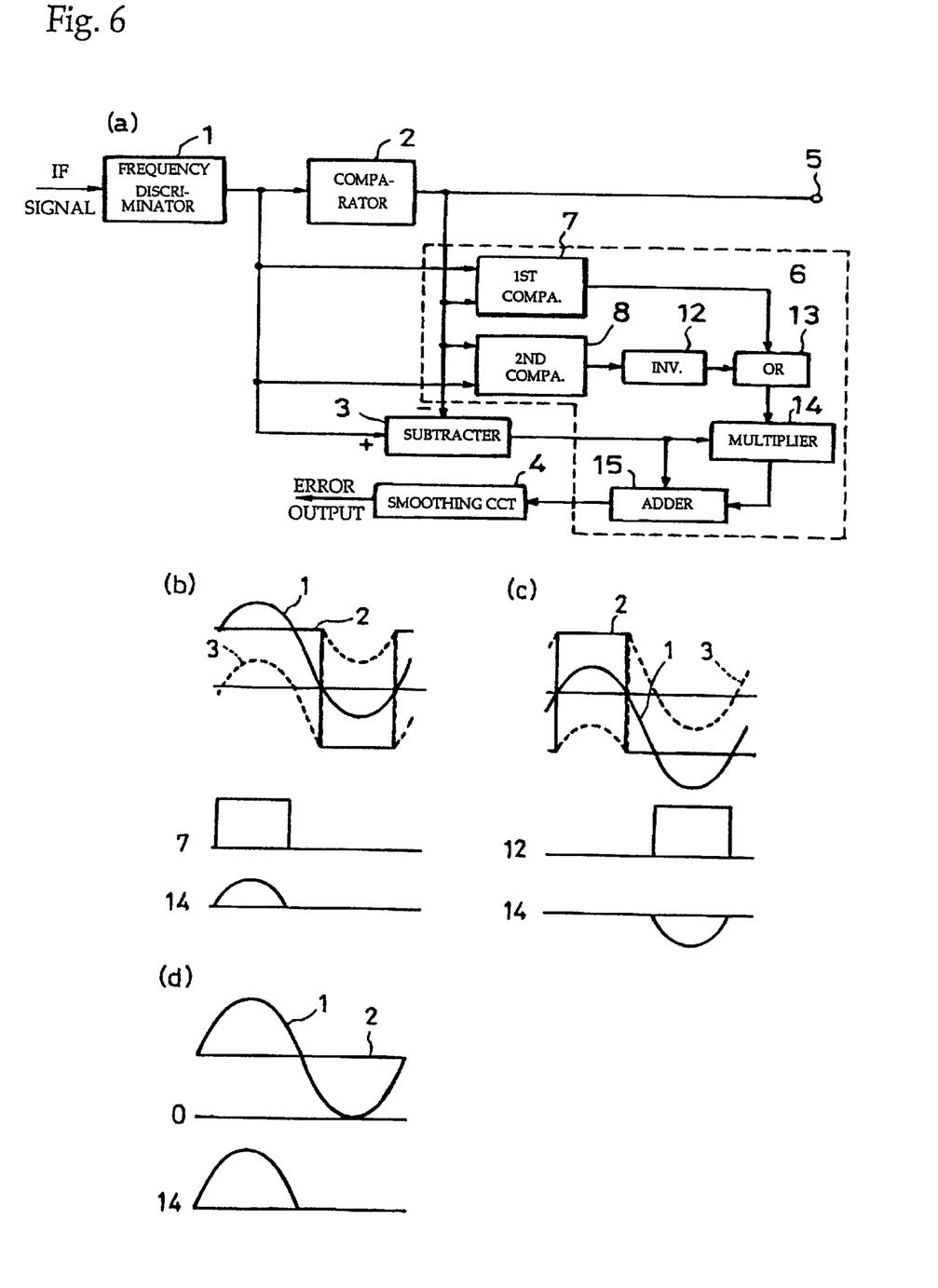

FIG. 6(*a*) shows a circuit according to a second embodiment of this invention, which restrains the occurrence of the zero point at $\alpha=1$. Also, in this circuit, a frequency discriminator 1, a comparator 2, a subtracter 3 and a smoothing circuit 4 which operate in the same manner as the corresponding elements in FIG. 1(*a*) are included. A circuit portion 6 enclosed by a dotted line frame, which acts as a correcting signal deriving circuit is newly added. The correcting signal deriving circuit 6 in FIG. 6(*a*) comprises first and second comparators 7 and 8 each of which receives the outputs of the frequency discriminator 1 and comparator 2, an inverter 12 which is connected to the output of the second comparator 8, an OR circuit which receives the outputs of the first comparator 7 and inverter 12, a multiplier 14 which receives the outputs of the OR circuit 13 and subtracter 3, and an adder 15 which receives the outputs of the multiplier 14 and subtracter 3 and has its output connected to the input of the smoothing circuit 4. The operation of this circuit is now explained using FIGS. 6(*b*)–(*d*). FIG. 6(*b*) shows waveforms output from various circuit components in the case of $0<\alpha<1$. In this Figure, waveform (1) identifies the output from the frequency discriminator 1, (2) the output from the comparator 2, (3) the output from the subtracter 3, (7) the output from the comparator 7, and (14) the output from the multiplier 14. The comparator 7 functions in the same manner as the comparator 7 in FIG. 5(*a*), and therefore it provides at its output a pulse as shown in the waveform (7). This pulse is applied through the OR circuit 13 to the multiplier 14 which multiplies it and the subtracter output together and provides a signal as shown by the waveform (14), this signal becoming, after added to the subtracter output, a correcting signal. At the time of $\alpha=1$ the relationship between the output waveforms (1) and (2) of the frequency discriminator 1 and comparator 2 becomes as shown in FIG. 6(*d*), and if there is no correcting signal the smoothed output of the subtracter output component is zero. However, because of the presence of the correcting component from the multiplier, it is possible to prevent the smoothed output from becoming zero. Assuming that the error signal in this case is S", it can be expressed as follows (detailed calculation stages are omitted):

$$S''=\alpha\pi-2\sin^{-1}\alpha+K[\sin\cdot\cos^{-}(1-\alpha)-\{\cos^{-1}(1-\alpha)\}(1-\alpha)] \quad (8)$$

K is a weight factor and can be selected to a voluntary value. S" for $\alpha$ in the case of K=1 can be plotted as curve S" in FIG. 2. Also, as for the case that $\alpha$ is negative, it will be appreciated from consideration of FIG. 6(*c*) that the correcting signal can be obtained in the similar manner.

Figure 7:
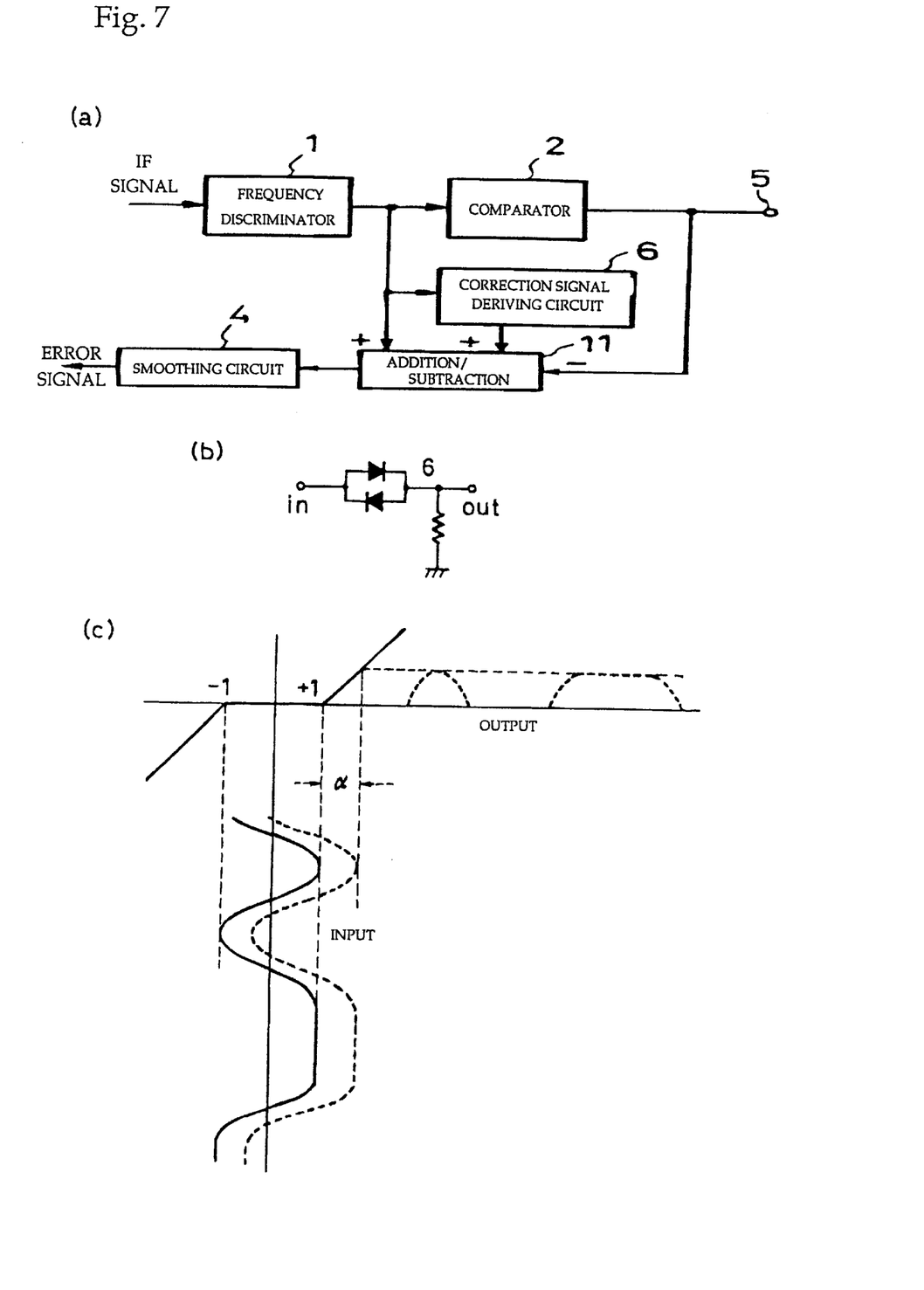

FIG. 7(*a*) shows a third embodiment according to this invention, in which a correcting signal deriving circuit 6 comprises a clip circuit as shown in FIG. 7(*b*), for example. This clip circuit 6 has such input/output characteristic as shown in FIG. 7(*c*) that only when an input signal is above ±1 it appears at the output of the clip circuit 6. The amplitude of the input signal is so set that its P—P (peak to peak) becomes this ±1, as shown by the solid line in FIG. 7(*c*). In case of the presence of a DC offset, only portions which protrude from ±1 appear at the output side. The example shown in FIG. 7(*c*) for providing such clip characteristic may includes a pair of reversely and parallel connected silicon epitaxial diodes each of which has a dead band area in a low voltage portion. Such arrangement can provide the dead band area of ±0.6 v without the use of a special bias voltage means. The above-mentioned ±1 setting is caused to correspond to this dead band area of ±0.6 v. The output signal of this correcting signal deriving circuit 6 is quite same as the output of the multiplier 14 in FIG. 6(*a*), and therefore the above-mentioned equation (8) is applicable as it is, to the error signal.

Although the three embodiments for obtaining the error signal have been explained, other embodiments could be thought as correcting means for the circuit disclosed in the Japanese Patent Pre-publication No. 235954/1995. In a word, it is needed that the correcting circuit have such characteristic that when the input signal amplitude is within the scope of ±1, it provides the output of zero, and as the DC offset becomes greater, it provide the output corresponding to the magnitude of this DC offset.

As has been explained above, while the system according to the prior invention shown in the Japanese Patent Pre-publication No. 235954/1995 has the advantage that any center frequency error in an FSK signal can be detected without the receipt of any influence of modulation code contents, it also has such disadvantage that at the point that the center frequency error becomes equal to the shift frequency the error output is zero, that is this system has the disabled point of error detection. This invention can overcome this disadvantage of the prior invention keeping the advantage alive. In accordance with this invention, since it is possible to detect any center error over all input range, correction in an AFC or at the base-band by using its output can be carried out.

While there has been shown and described preferred embodiments, it is to be understood that various other adaptations and modifications may be made within the spirit and scope of the invention.

What is claimed is:

1. A center frequency detecting circuit for an FSK signal receiver for detecting a DC center level of a base-band signal wherein a base-band signal obtained through demodulation of a received FSK signal is applied to a first positive input of an addition/subtraction circuit as well as to a waveform shaping circuit for shaping it into a rectangular wave which constitutes a demodulated output signal, said demodulated output signal being input to a negative input of said addition/subtraction circuit after it was made equal to said base-band signal in amplitude, and said addition/subtraction circuit providing an output which is adapted to be smoothed to obtain a detected error, said center frequency detecting circuit comprising:

circuit means for correcting the above error detecting operation, said circuit means configured to receive said base-band signal and said demodulated output signal and configured to supply a correcting signal to a second positive input of said addition/subtraction circuit.

2. The center frequency detecting circuit for an FSK signal receiver of claim 1 wherein said waveform shaping circuit is a comparator having a comparison reference voltage of zero volt.

3. The center frequency detecting circuit for an FSK signal receiver of claim 1 wherein said circuit means comprises:

first level generating means for generating a first level output of a first polarity only when the demodulated base-band signal output became positive voltage with respect to the output of said waveform shaping circuit;

second level generating means for generating a second level output of a second polarity which is different from said first polarity only when the demodulated base-band signal output became negative voltage with respect to the output of said waveform shaping circuit; and means for composing said first and second level output so that when the demodulated base-band signal output became positive voltage with respect to the output of said waveform shaping circuit a positive level output is applied to said second positive input of said addition/subtraction circuit, and when the demodulated base-band signal output became negative voltage with respect to the output of said waveform shaping circuit a negative level output is applied to said second positive input of said addition/subtraction circuit.

4. The center frequency detecting circuit for an FSK signal receiver of claim 3 wherein said circuit means further comprising:

a first weight circuit for receiving said first level output and providing a weight thereto; and a second weight circuit for receiving said second level output and providing a weight thereto.

5. The center frequency detecting circuit for an FSK signal receiver of claim 3 wherein said composing means comprises:

an OR circuit for receiving said first and second level outputs which were made to be of the same polarity; and a multiplier responsive to an output of said OR circuit and the result of subtraction of said rectangular signal from said demodulated base-band signal for generating such correcting signal that when the demodulated base-band signal output became positive voltage with respect to the output of said waveform shaping circuit a positive level output is applied to said second positive input of said addition/subtraction circuit, and when the demodulated base-band signal output became negative voltage with respect to the output of said waveform shaping circuit a negative level output is applied to said second positive input of said addition/subtraction circuit.

6. The center frequency detecting circuit for an FSK signal receiver of claim 1 wherein said circuit means comprises a clip circuit responsive to said demodulated base-band signal input for outputting its portions which exceed predetermined positive and negative levels in the positive and negative directions, respectively.

7. The center frequency detecting circuit for an FSK signal receiver of claim 6 wherein said clip circuit includes a pair of reversely and parallel connected diodes.

* * * * *